(12) United States Patent
Dierenfeldt et al.

(10) Patent No.: US 8,944,382 B2
(45) Date of Patent: Feb. 3, 2015

(54) METHOD FOR MOUNTING AN AIRCRAFT COMPONENT AND AIRCRAFT ASSEMBLY (75) Inventors: Frank Dierenfeldt, Hamburg (DE); Gerd Stahl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 361 days.

(21) Appl. No.: 13/601,485

(22) Filed: Aug. 31, 2012

(65) Prior Publication Data

US 2013/0056584 A1    Mar. 7, 2013

Related U.S. Application Data (60) Provisional application No. 61/530,442, filed on Sep. 2, 2011.

(30) Foreign Application Priority Data

Sep. 2, 2011 (DE) .......................... 10 2011 112 318

(51) Int. Cl.
*B64C 1/14*        (2006.01)
*B64F 5/00*        (2006.01)
*B64C 25/10*       (2006.01)

(52) U.S. Cl.
CPC ............... *B64F 5/0045* (2013.01); *B64C 25/10* (2013.01)
USPC .................. 244/129.4; 244/102 R; 244/129.5

(58) Field of Classification Search
USPC ..................... 244/102 R, 129.1, 129.4, 129.5
See application file for complete search history.

(56) References Cited

U.S. PATENT DOCUMENTS

| | | | | |
|---|---|---|---|---|
| 3,791,073 | A * | 2/1974 | Baker | 49/249 |
| 5,556,491 | A * | 9/1996 | Servanty et al. | 156/64 |
| 6,177,189 | B1 * | 1/2001 | Rawlings et al. | 428/343 |
| 2006/0103853 | A1 * | 5/2006 | Palmateer | 356/601 |
| 2008/0173760 | A1 * | 7/2008 | Ponsart et al. | 244/129.5 |
| 2011/0127376 | A1 | 6/2011 | Gleyse | |
| 2011/0169924 | A1 * | 7/2011 | Haisty et al. | 348/51 |

FOREIGN PATENT DOCUMENTS

EP    1 615 819    1/2006

* cited by examiner

*Primary Examiner* — Philip J Bonzell
*Assistant Examiner* — Nicholas McFall
(74) *Attorney, Agent, or Firm* — Dickinson Wright PLLC (57) ABSTRACT

A method for mounting an aircraft component, which in the mounted state is movable between a first and a second operating position and is taken up in its first operating position in a mounting area, comprises the measuring of the mounting area, in order to obtain data characteristic of the shape and/or the dimensions of the mounting area. The data characteristic of the shape and/or the dimensions of the mounting area are projected onto the aircraft component arranged in its second operating position. Finally, the aircraft component arranged in its second operating position is adjusted with reference to the projection of the data characteristic of the shape and/or the dimensions of the mounting area.

11 Claims, 7 Drawing Sheets

METHOD FOR MOUNTING AN AIRCRAFT COMPONENT AND AIRCRAFT ASSEMBLY

The invention relates to a method for mounting an aircraft component and an aircraft assembly.

In modern transport aircraft, a plurality of components and assemblies are installed that have to assume different operating positions in operation. One example of this is the main landing gear of the aircraft. In flight operation of the aircraft, the main landing gear is located in a first operating position, in which the main landing gear is retracted and taken up in a corresponding receptacle area in the lower fuselage shell of the aircraft. In ground operation of the aircraft as well as on take-off and landing, the main landing gear assumes a second operating position, on the other hand, in which the main landing gear is swung out from the lower fuselage shell of the aircraft. The landing gear must therefore be fitted into the receptacle area in the lower fuselage shell of the aircraft. In particular, the landing gear fairing must be mounted in such a position that it does not obstruct the retraction of the landing gear and the take-up of the landing gear in the receptacle area in the lower fuselage shell of the aircraft. In a similar manner, the mounting position of a landing gear door described, for example, in US 2011/0127376 A1 or EP 1 615 819 B1 must be chosen such that the landing gear door closes properly an opening provided for retraction and swinging out of the landing gear in the lower fuselage shell of the aircraft in its first operating position.

At present, the aircraft is jacked up during the mounting and adjustment of the main landing gear components, meaning that the weight of the aircraft is not borne by the main landing gear. This makes it possible to retract the landing gear and perform the fine adjustment of the main landing gear components and in particular of the landing gear fairing in the retracted state of the landing gear. The mounting work associated with this must be carried out "overhead", however, in an uncomfortable working position and is rendered complicated and time-consuming due not least to this. Furthermore, various other mounting jobs, for example on the aircraft structure or in the aircraft cabin, cannot be carried out while the aircraft is jacked up.

The object of the invention is to specify a method that simplifies the mounting of an aircraft component movable in operation between a first and a second operating position. Furthermore, the object of the invention is to provide an aircraft assembly that is mountable by means of such a method.

This object is achieved by a method for mounting an aircraft component with the features of claim 1 and an aircraft assembly with the features of claim 7.

The method according to the invention can be used in the mounting of an aircraft component, which in the mounted state is movable between a first and a second operating position and in its first operating position is taken up in a mounting area. In particular, in its movement between its first and its second operating position, the aircraft component follows a set, i.e. known movement path. The movement path can be determined mechanically, for example if the movement of the aircraft component between its first and its second operating position is achieved by a pivot movement or a rotation about a defined axis. Alternatively to this, however, a determination of the movement path by corresponding control of the movement of the aircraft component between its first and its second operating position, for example by means of an electronic control unit or the like, is also conceivable.

"Mounting area" here is understood to mean an area of the aircraft that completely or partially encloses the aircraft component or abuts on the aircraft component. The mounting area may comprise a further aircraft component or further aircraft components. It is only essential that the dimensions and the shape of the aircraft component movable between a first and a second operating position must be adapted to the dimensions and the shape of the further aircraft component or the further aircraft components in the mounting area, so that the movement of the aircraft component between its first and its second operating position is not obstructed and/or the aircraft component is mounted in a proper manner into the mounting area when it is located in its first operating position. The aircraft component movable between a first and a second operating position may be a single component, but also an assembly comprising several components.

In the mounting method according to the invention, the mounting area is measured, preferably in a first step, in order to obtain data characteristic of the shape and/or the dimensions of the mounting area. During the measurement of the mounting area, the aircraft component that is movable between a first and a second operating position may be located in its second operating position, i.e. be already mounted on the aircraft. Alternatively to this, it is also conceivable, however, to measure the mounting area while no connection yet exists between the aircraft component movable between a first and a second operating position and the aircraft.

In the next step, the data characteristic of the shape and/or the dimensions of the mounting area are projected onto the aircraft component arranged in its second operating position. The projection is created in particular on the basis of a representational function, which is defined as a function of the movement path that the aircraft component follows in its movement between its first and its second operating position. The arrangement of the aircraft component in its second operating position does not necessarily require the aircraft component to be already attached to the aircraft. It is only essential that the aircraft component is in a position that the aircraft component assumes in the mounted state in its second operating position. The projection of the data characteristic of the shape and/or the dimensions of the mounting area is preferably a light projection, which identifies the shape and/or the dimensions of the mounting area and thereby simulates the arrangement of the aircraft component in its first operating position in the mounting area, although the aircraft component is located in its second operating position. It can thus be checked with reference to the projection of the data characteristic of the shape and/or the dimensions of the mounting area whether the aircraft component can be taken up properly in the mounting area in its first operating position without it being necessary to move the aircraft component physically into its first operating position for this.

Finally, the aircraft component arranged in its second operating position is adjusted with reference to the projection of the data characteristic of the shape and/or the dimensions of the mounting area, i.e. it is fine-positioned, in order to compensate for any mispositionings of the aircraft component. The adjustment work can consequently be carried out in the mounting method according to the invention on the aircraft component located in its second operating position and thus easily accessible. The adjustment of the aircraft component can be considerably simplified thereby. The mounting method according to the invention thus facilitates the realisation of considerable savings in time and thus cost.

A laser measuring method is preferably used in the mounting method according to the invention to measure the mounting area. In addition or alternatively to this, the projection of the data characteristic of shape and/or the dimensions of the mounting area may be created by means of a laser projection method. Laser measurement and projection methods are particularly well suited to the precise measurement of the mounting area and to the precise projection of the data characteristic of the shape and/or dimensions of the mounting area onto the aircraft component arranged in its second operating position. Moreover, these methods are easy to use.

Points and/or lines may be projected as data characteristic of the shape and/or the dimensions of the mounting area onto the aircraft component arranged in its second operating position. For example, delimitation points and/or delimitation lines of an area in which the aircraft component has to be positioned in order to allow a take-up according to specification of the aircraft component in the mounting area may be projected onto the aircraft component arranged in its second operating position. The number and form of the points and/or lines to be projected may be adapted as required to the shape of the mounting area and/or of the aircraft component.

In general, the method according to the invention may be used in the mounting of any aircraft component or any aircraft assembly which is movable in the mounted state between a first and a second operating position and is taken up in its first operating position in a mounting area. The method according to the invention may be used especially advantageously, however, in the mounting of an aircraft component that forms a component of an aircraft landing gear. The use of the method according to the invention in the mounting of landing gear components facilitates an adjustment of these components with the landing gear swung out. Jacking up of the aircraft to carry out these jobs can be dispensed with, therefore. On the contrary, the jobs can be carried out on the standing aircraft, which is not jacked up. This makes it possible to realise substantial time and cost advantages, as the use of the mounting method according to the invention allows not only simplified mounting of the aircraft landing gear components, but also the continuation of other mounting jobs on the aircraft that cannot be carried out when the aircraft is jacked up.

For example, the method according to the invention may be used in the mounting of a landing gear fairing. The landing gear fairing may then be attached to a leg of the landing gear or another supporting component and roughly positioned with the landing gear swung out. Following the measurement of the mounting area taking up the landing gear fairing in the retracted state of the landing gear in a landing gear bay of the lower fuselage shell, the mounting area, i.e. in particular the boundaries of the mounting area taking up the landing gear fairing in the retracted state of the landing gear, may be projected onto the landing gear fairing, for example in the form of laser light lines or laser light points. The adjustment of the landing gear fairing, i.e. the exact positioning of the landing gear fairing, can finally take place in comfort on the swung out landing gear. The method according to the invention may be used in a similar manner in the mounting of a landing gear door. For example, the landing gear door may be attached in the swung-out state to a corresponding supporting component in the area of the landing gear bay and then fine-adjusted in the swung-out state with the aid of a projection of the mounting area taking up the landing gear door in the retracted state of the landing gear.

When adjusting the aircraft component arranged in its second operating position, a first guide device provided on the aircraft component preferably interacts with a complementary second guide device, which is attached to a supporting component provided for connection to the aircraft component. The interaction of the guide devices makes it easier to adjust the aircraft component further with reference to the projection of the data characteristic of the shape and/or the dimensions of the mounting area. In the aforementioned example of an aircraft component designed in the form of a landing gear fairing, the first guide device can thus be attached to the landing gear fairing and be designed for interaction with a complementary second guide device, which is provided for example on a leg of the landing gear.

The first guide device may comprise a guide rail, for example, which is provided for interaction with a guide element of the second guide device, which element is designed in particular in the shape of a mushroom head. Alternatively to this, the first guide device may naturally also comprise a guide element that is in the shape of a mushroom head in particular, which is provided for take-up in a guide rail of the second guide device.

An aircraft assembly according to the invention comprises at least one aircraft component, which is movable between a first and a second operating position and is taken up in a mounting area in a first operating position. The aircraft component is mounted according to a method described above in its final position within the aircraft assembly.

The aircraft assembly may comprise a first aircraft component designed in the form of a landing gear fairing, which is mounted according to the method described above in its final position on a landing gear leg of an aircraft landing gear.

In addition or alternatively to this, the aircraft assembly may comprise a second aircraft component designed in the form of a landing gear door, which is mounted according to a method described above in its final position on a supporting component arranged in the area of a landing gear bay.

The second aircraft component designed in the form of a landing gear door may be mounted on the supporting component via a connection element, which is designed in particular in the form of a substantially U-shaped link. An aircraft assembly with a second aircraft component in the form of a landing gear door, which is mounted on the supporting component via a connection element formed in particular in the form of a substantially U-shaped link, may also be claimed independently of a mounting method described above, i.e. this aircraft assembly does not necessarily have to be mounted according to a method described above.

Preferred embodiments of the invention are now explained in greater detail with reference to the enclosed schematic drawings, of which

In the flow chart according to FIG. 1, a method for mounting an aircraft component is illustrated, which method is explained in greater detail below. This method is explained below taking the mounting of two components of an aircraft main landing gear 10 shown in FIG. 2 as an example. The main landing gear 10 comprises two double wheels 12, which are each connected via a landing gear leg 14 in the area of a main landing gear bay 16 to the aircraft. A section of the main landing gear bay 16 facing the centre line of the aircraft is closable by main landing gear doors 18, i.e. to be able to bring the main landing gear 10 into its swung-out position shown in FIG. 2, the main landing gear doors 18 must be opened. Following swinging out of the main landing gear 10, the main landing gear doors 18 do not have to remain in their open position shown in FIG. 2, however, but can also be closed again.

Attached to each landing gear leg 14 is a landing gear fairing 20. The attachment of the landing gear fairing 20 to the landing gear leg 14 is achieved by means of corresponding attachment devices 22, which engage at defined hold points on the landing gear leg 14 and the landing gear fairing 20, see FIGS. 3 to 5 and 7.

Figure 8:
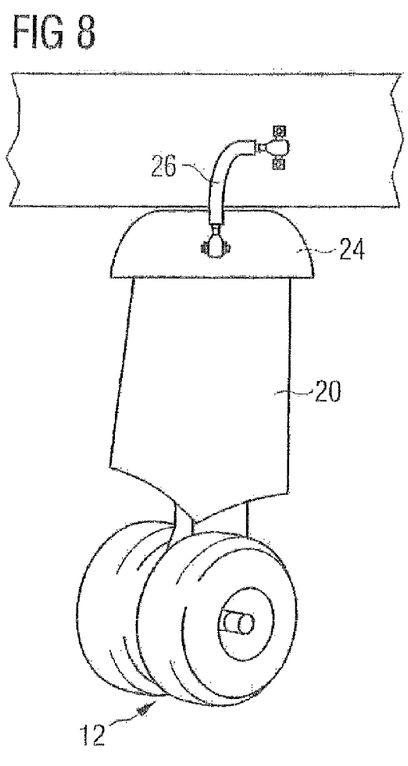
FIG. 8 shows a further detailed view of an aircraft main landing gear, in which in particular the landing gear fairing and a landing gear door are illustrated.
Figure 9:
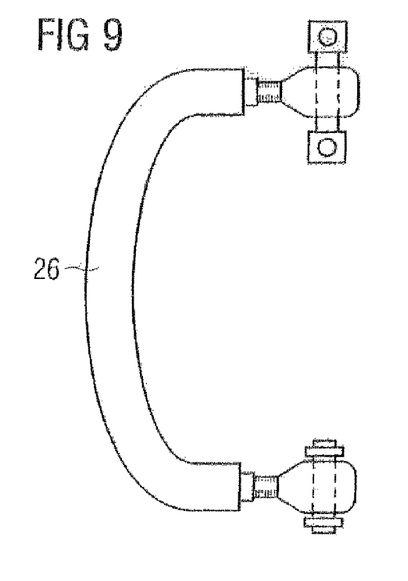
FIG. 9 shows a connection element for attaching a landing gear door to a supporting component.

Finally the main landing gear 10 comprises two further landing gear doors 24, which are each mounted on the aircraft on a side of the landing gear legs 14 facing away from the centre line of the aircraft in the area of the main landing gear bay 16. The connection of the landing gear doors 24 to the aircraft is accomplished by a connection element 26, which is formed in the form of a substantially U-shaped link. Provided between the connection element 26 and the landing gear door 24 is a preferably rigid connection such that it is made possible to move the landing gear door 24 between its open position and its closed position by swiveling the connection element 26, see FIGS. 4, 8 and 9.

The mounting of the landing gear fairing 20 and the landing gear door 24 is explained below. Both the landing gear fairing 20 and the landing gear door 24 are movable in operation between a first operating position, which these two components assume when the main landing gear 10 is retracted, and a second operating position, which these two components assume when the main landing gear 10 is swung out. The movement path of the landing gear fairing 20 and the landing gear door 24 between the first and the second operating position is determined mechanically by the swivel movement of the landing gear leg 14 about a corresponding hinge and is thus known. When the landing gear fairing 20 and the landing gear door 24 are located in their first operating position when the main landing gear 10 is retracted, these two components must fit as accurately as possible into corresponding recesses in the lower fuselage shell of the aircraft. In their first operating position, the landing gear fairing 20 and the landing gear door 24 are thus taken up in a mounting area, which is formed by the components and/or lower fuselage shell sections in the area of the main landing gear bay 16 surrounding the landing gear fairing 20 and the landing gear door 24 in their first operating position.

When mounting the landing gear fairing 20 and the landing gear door 24, first the mounting area is measured by means of a laser measurement method. Data characteristic of the shape and the dimensions of the mounting area are determined in the scope of this laser measurement method. Then the landing gear fairing 20 and the landing gear door 24 are mounted and roughly positioned in their second operating position illustrated in the figures, which position these two components assume when the main landing gear 10 is swung out. To adjust, i.e. fine-position the landing gear fairing 20 and the landing gear door 24, a laser projection is then created, with which the data characteristic of the shape and the dimensions of the mounting area are projected onto the landing gear fairing 20 located in its second operating position and the landing gear door 24 located in its second operating position. The laser projection is created on the basis of a representational function dependent on the known movement path of the landing gear fairing 20 and the landing gear door 24 between the first and the second operating position.

The laser light projection can be configured as required. In the example illustrated in FIG. 6, six laser light points 28, which show the shape and the dimensions of the mounting area for taking up the landing gear fairing 20 in its first operating position, are projected as the data characteristic of the shape and the dimensions of the mounting area onto the landing gear fairing 20 located in its second operating position. The projection of the data characteristic for the shape and the dimensions of the mounting area taking up the landing gear door 24 in its first operating position is performed in the same way.

Figure 6:
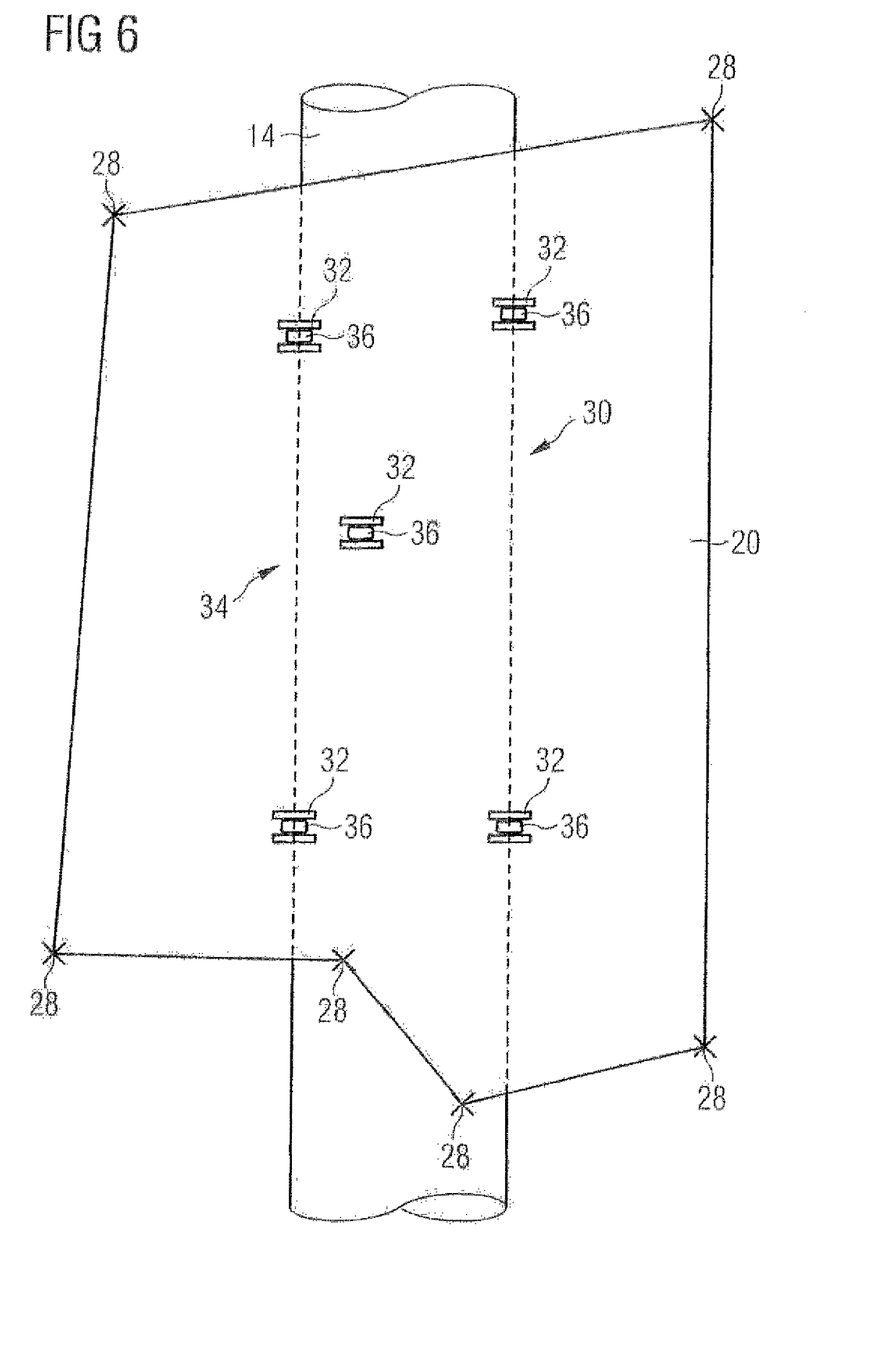
FIG. 6 shows the adjustment of the position of a landing gear fairing with reference to a projection of data characteristic of the shape and/or the dimensions of a mounting area taking up the landing gear fairing in a first operation position.
Figure 7:
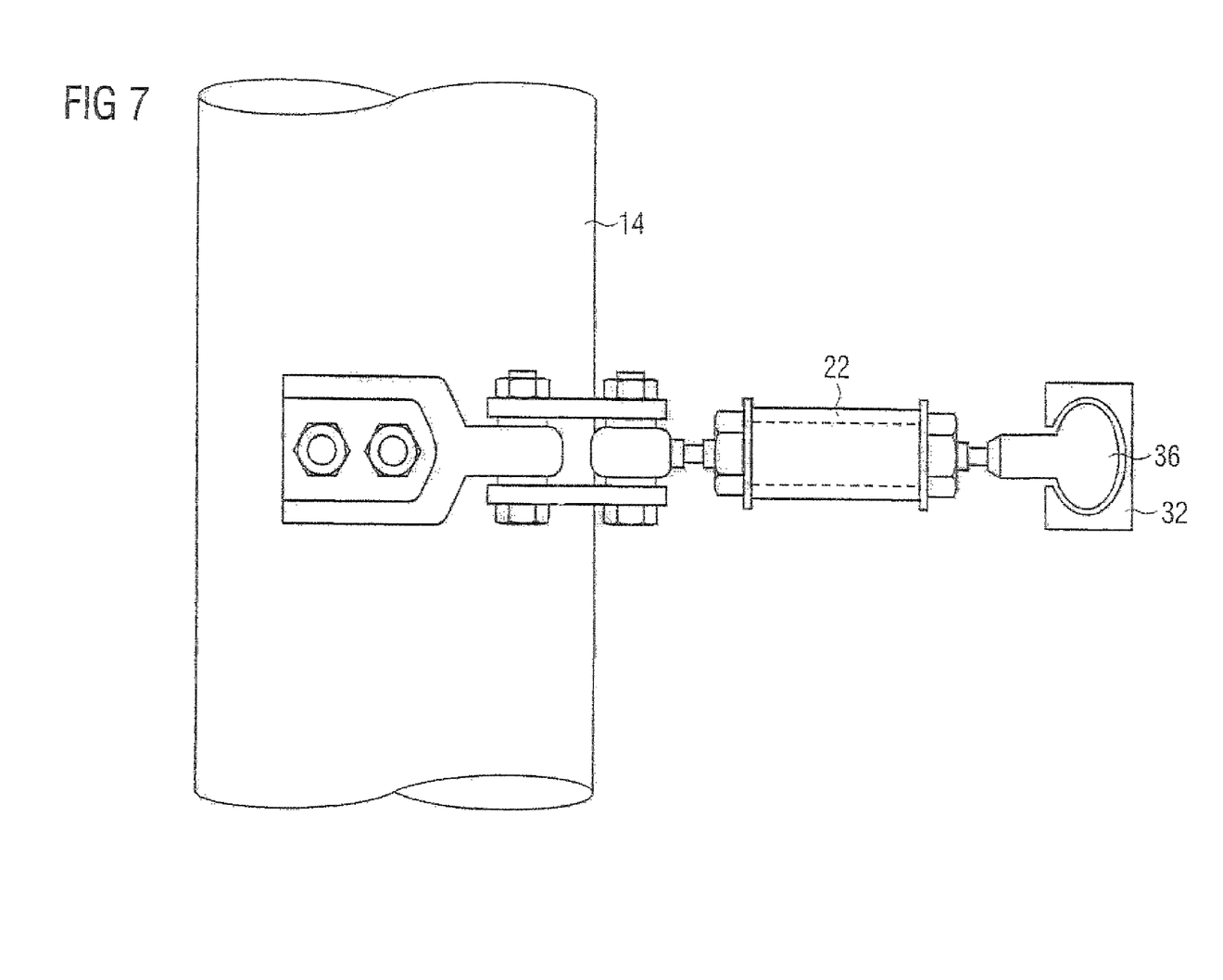
FIG. 7 shows guide devices for positioning the landing gear fairing relative to a landing gear leg.

Finally, the landing gear fairing 20 and the landing gear door 24 are adjusted, i.e. fine-positioned with reference to the projection of the data characteristic of the shape and the dimensions of the mounting area, i.e. with reference to the laser light points 28 in the embodiment shown. Due to the projection of the data characteristic of the shape and the dimensions of the mounting area, the arrangement of the landing gear fairing 20 and the landing gear door 24 in their respective first operating positions in the respective mounting areas is simulated, although the components are located in their second operating position. The projection thus facilitates checking whether the landing gear fairing 20 and the landing gear door 24 can be taken up according to specification into their mounting area in their first operating position without it being necessary for this to move the landing gear fairing 20 and the landing gear door 24 physically into their first operating position. Retraction of the main landing gear 10 for checking the positioning of the landing gear fairing 20 and the landing gear door 24 can be dispensed with, therefore. Consequently, jacking up of the aircraft to facilitate the retraction of the main landing gear 10 is no longer necessary either.

To further simplify the adjustment of the landing gear fairing 20 relative to the landing gear leg 14 with the aid of the projection of the data characteristic of the shape and the dimensions of the mounting area taking up the landing gear fairing 20 in its first operating position, a first guide device 30 is provided on the landing gear fairing 20. The first guide device 30 comprises a plurality of guide rails 32, which are laminated into the landing gear fairing 20 in the area of a surface of the landing gear fairing 20 that faces the landing gear leg 14, see FIGS. 6 and 7. The landing gear leg 14 is provided on the other hand with a second guide device 34, which comprises a plurality of guide elements 36 in the shape of mushroom heads. Each guide element 36 is taken up in a corresponding guide rail 32 of the guide device 30 attached to the landing gear fairing 20. Due to the interaction of the guide devices 30, 34, a guided movement of the landing gear fairing 20 relative to the landing gear leg 14 and thus a simplified positioning of the landing gear fairing are facilitated.

Figure 1:
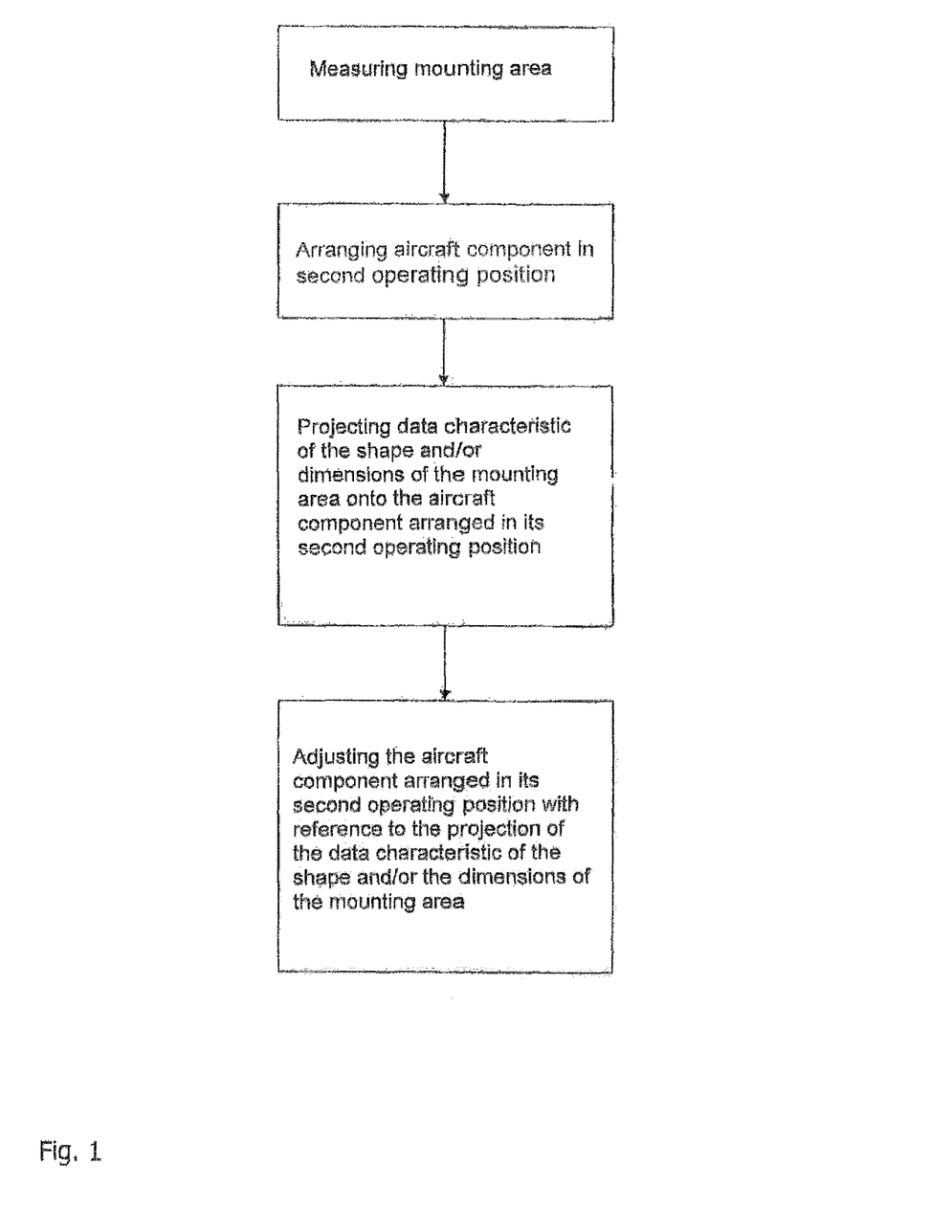
FIG. 1 shows a flow chart, in which a method for mounting an aircraft component is illustrated.
Figure 2:
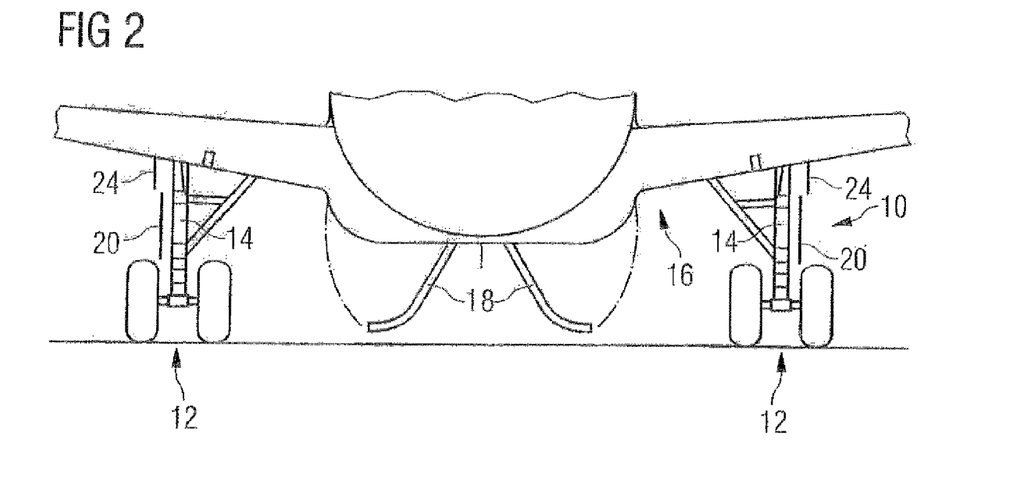
FIG. 2 shows an overview representation of an aircraft main landing gear.
Figure 3:
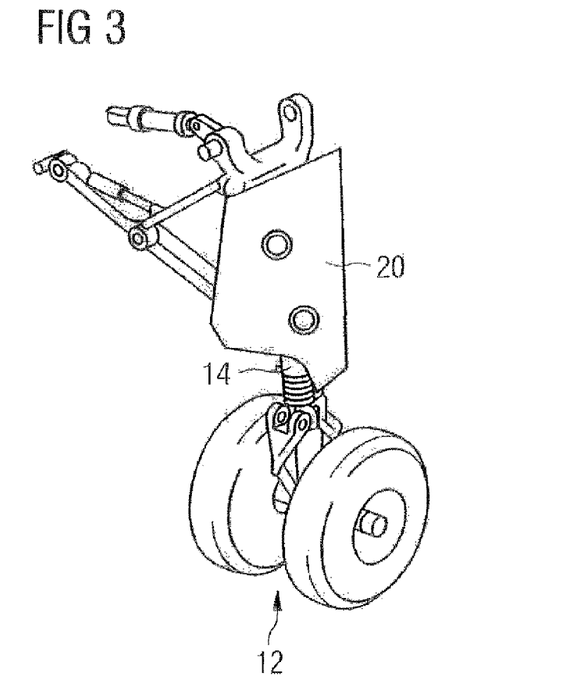
FIG. 3 shows a three-dimensional detailed representation of an aircraft main landing gear.
Figure 4:
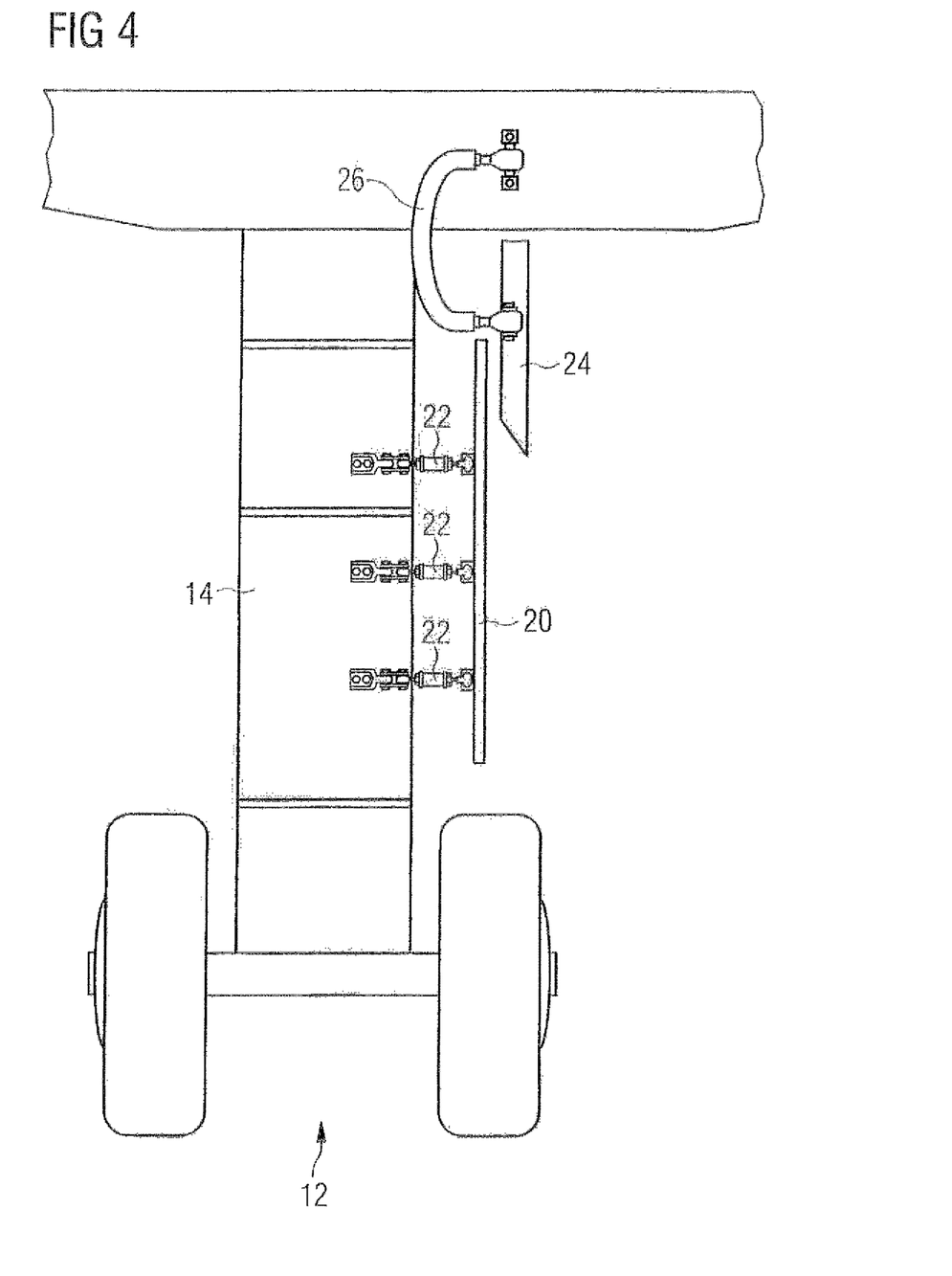
FIG. 4 shows a further detailed representation of an aircraft main landing gear.
Figure 5:
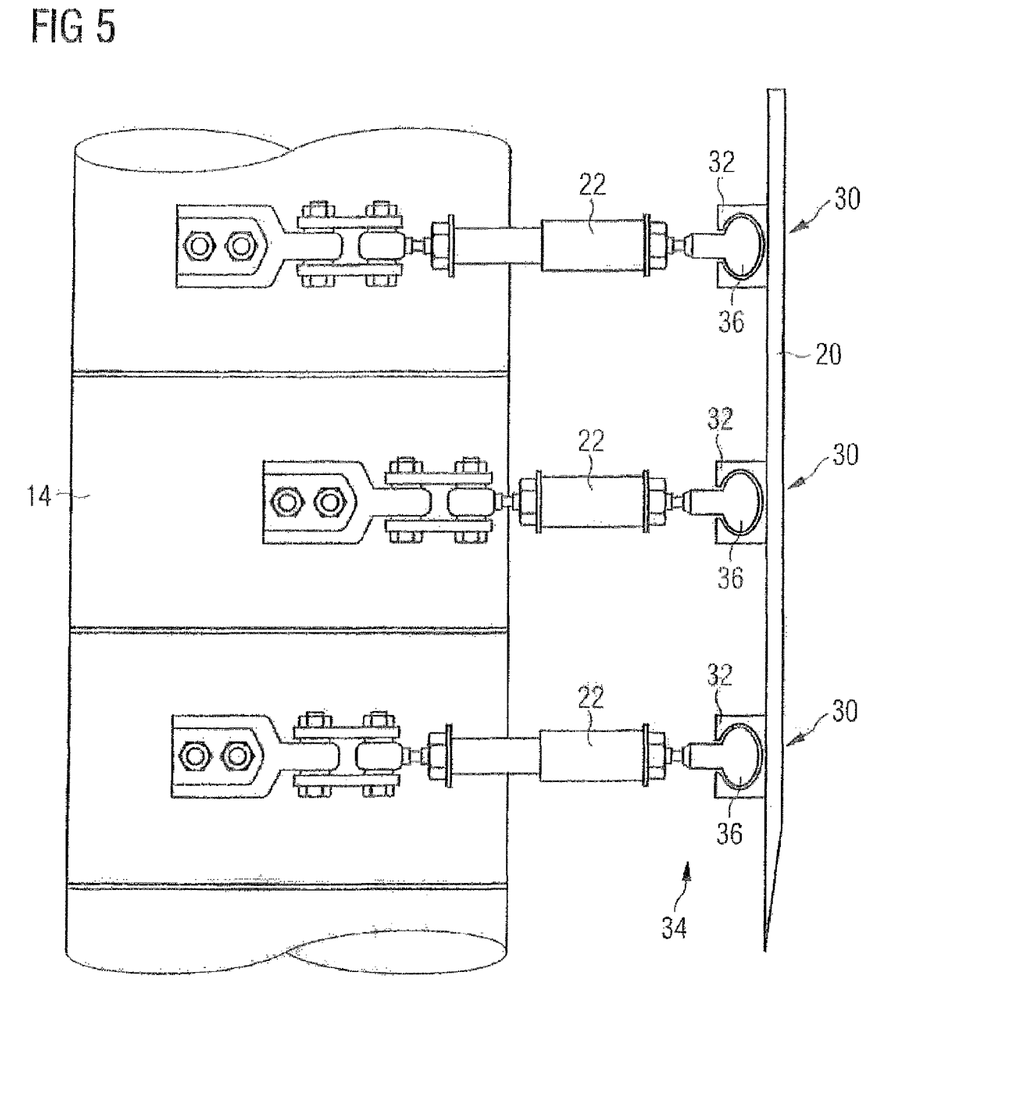
FIG. 5 shows a detailed representation of a landing gear fairing attached to a landing gear leg.

The mounting method illustrated in the flow chart according to FIG. 1 was described here in connection with the mounting of a landing gear fairing 20 and a landing gear door 24. It goes without saying, however, that the method can be used when mounting any aircraft component or any aircraft assembly that is movable in operation between a first and a second operating position and is taken up in its first operating position in a mounting area.

The invention claimed is:

1. A method for mounting an aircraft component on an aircraft, wherein in a mounted state the aircraft component is movable between a first operating position and a second operating position and wherein in the second operating position the aircraft component is mounted on the aircraft and extended from a mounting area of the aircraft and in the first operating position the aircraft component is mounted on the aircraft and taken up and received within the mounting area, wherein the method comprises:

measuring the mounting area, in order to obtain data characteristic of at least one of the shape and the dimensions of the mounting area;

projecting the data characteristic of the at least one of the shape and the dimensions of the mounting area onto the aircraft component arranged in the second operating position; and     adjusting the aircraft component when arranged in the second operating position with reference to the projection of the data characteristic of the at least one of the shape and the dimensions of the mounting area.

2. A method according to claim 1, wherein the mounting area is measured by means of a laser measurement method.

3. A method according to claim 1, wherein at least one of points and lines are projected as the data onto the aircraft component arranged in the second operating position.

4. A method according to claim 1, wherein the aircraft component is a component of an aircraft landing gear.

5. A method according to claim 1, wherein, when adjusting the aircraft component arranged in its second operating position, a first guide device provided on the aircraft component interacts with a complementary second guide device, which is attached to a supporting component provided for connection to the aircraft component.

6. A method according to claim 5, wherein the first and the second guide devices comprise a guide rail and a guide element.

7. A method according to claim 1, wherein the projection of the data characteristic of the shape of the mounting area is created by means of a laser projection method.

8. A method according to claim 4, wherein the aircraft component comprises at least one of a landing gear fairing and a landing gear door.

9. A method according to claim 6, wherein the guide element is in the shape of a mushroom head, provided for take-up in the guide rail.

10. A method according to claim 1, wherein the projection of the data characteristic of the shape of the mounting area comprises creating a laser projection based on a representational function dependent on a known movement path of the aircraft component between the first operating position and the second operating position.

11. A method according to claim 1, wherein, in the mounted position, the aircraft component is movably mounted to the aircraft.

* * * * *